US012261389B2

(12) United States Patent
Panitz

(10) Patent No.: US 12,261,389 B2
(45) Date of Patent: Mar. 25, 2025

(54) ELECTRICAL PLUG-TYPE CONNECTION AND ELECTRICAL CONNECTOR

(71) Applicant: TE Connectivity Germany GmbH, Bensheim (DE)

(72) Inventor: Gregor Panitz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 562 days.

(21) Appl. No.: 17/382,996

(22) Filed: Jul. 22, 2021

(65) Prior Publication Data

US 2022/0029340 A1 Jan. 27, 2022

(30) Foreign Application Priority Data

Jul. 22, 2020 (DE) ......................... 102020119321.1

(51) Int. Cl.

*H01R 13/44* (2006.01)
*H01R 13/502* (2006.01)
*H01R 13/627* (2006.01)
*H01R 13/631* (2006.01)

(52) U.S. Cl.

CPC ........... *H01R 13/44* (2013.01); *H01R 13/502* (2013.01); *H01R 13/6278* (2013.01); *H01R 13/631* (2013.01)

(58) Field of Classification Search

CPC .. H01R 13/44; H01R 13/502; H01R 13/6278; H01R 13/631; H01R 24/005; H01R 2103/00; H01R 2201/26; H01R 24/38; H01R 13/629; H01R 13/648; H01R 35/00
See application file for complete search history.

(56) References Cited

U.S. PATENT DOCUMENTS 5,586,901 A 12/1996 Muta
5,716,224 A 2/1998 Masuda et al.
8,192,212 B2 * 6/2012 Casses ............... H01R 13/6272 439/181
8,734,191 B2 * 5/2014 Zhao .................. H01R 13/6456 439/701

(Continued)

FOREIGN PATENT DOCUMENTS

CN 105932468 A 9/2016
DE 10 2017 126 546 A1 5/2019

(Continued)

OTHER PUBLICATIONS

Japanese Office Action with English Translation, Application No. 2021-118676, Dated: Jul. 5, 2022, 14 pages.

(Continued)

*Primary Examiner* — Abdullah A Riyami
*Assistant Examiner* — Nader J Alhawamdeh
(74) *Attorney, Agent, or Firm* — Barley Sndyer

(57) ABSTRACT

An electrical plug-type connection comprises a first connector including a connector housing and at least one electrical terminal arranged therein, and a mating connector for coupling to the first connector. The mating connector includes at least one mating electrical terminal extending in an axial direction, and a mating terminal touch protection device movable from an initial position into a final position by the connector housing as the first connector and the mating connector are coupled.

19 Claims, 4 Drawing Sheets

(56) References Cited

U.S. PATENT DOCUMENTS

| | | | | |
|---|---|---|---|---|
| 10,381,752 | B2 * | 8/2019 | Kaehny | H01R 4/34 |
| 11,046,338 | B2 | 6/2021 | Aquino De Oliveira et al. | |
| 2006/0003629 | A1 | 1/2006 | Murphy et al. | |
| 2007/0190868 | A1 * | 8/2007 | De Cloet | H01R 13/6277 439/851 |
| 2011/0171843 | A1 * | 7/2011 | Casses | B60L 53/16 29/426.1 |
| 2011/0207360 | A1 * | 8/2011 | Jordan | H01R 13/65912 439/350 |
| 2012/0301081 | A1 | 11/2012 | Affre De Saint Rome et al. | |
| 2018/0294600 | A1 * | 10/2018 | Loncar | H01R 13/44 |
| 2018/0375227 | A1 * | 12/2018 | Kaehny | H01R 13/44 |
| 2019/0190192 | A1 * | 6/2019 | Mori | H01R 13/6581 |
| 2019/0190211 | A1 * | 6/2019 | Yamanashi | H01R 13/6592 |
| 2020/0395701 | A1 * | 12/2020 | Dillmann | H01R 13/6315 |
| 2022/0029340 | A1 * | 1/2022 | Panitz | H01R 13/6278 |
| 2022/0231436 | A1 * | 7/2022 | Buechling | H01M 50/502 |
| 2022/0311172 | A1 * | 9/2022 | Hoffmann | H02G 15/04 |

FOREIGN PATENT DOCUMENTS

| | | | |
|---|---|---|---|
| EP | 3389146 | A1 | 10/2018 |
| JP | H1209678 | A | 8/1989 |
| JP | H01209678 | A | 8/1989 |
| JP | H8163813 | A | 6/1996 |
| JP | 11008005 | A | 1/1999 |
| JP | 2018200864 | A | 12/2018 |

OTHER PUBLICATIONS

Extended European Search Report, Application No. 21187204.9-1201, Dated: Dec. 10, 2021, 8 pages.

Second Chinese Office Action dated Jul. 26, 2024 with English translation, corresponding to Application No. 202110817994.6, 14 pages.

Japanese Office Action dated Oct. 29, 2024 with English translation, corresponding to Application No. 2023-196367, 14 pages.

* cited by examiner

ELECTRICAL PLUG-TYPE CONNECTION AND ELECTRICAL CONNECTOR

CROSS-REFERENCE TO RELATED APPLICATIONS

This application claims the benefit of German Patent Application No. 102020119321.1 filed on Jul. 22, 2020, the entire disclosure of which is incorporated herein by reference.

FIELD OF THE INVENTION

The invention relates to an electrical plug-type connection and an electrical connector having improved touch protection safeguards.

BACKGROUND

In the electricity sector (electronics, electrical engineering, electrics, electrical energy technology), various types of electrical connectors are known which serve to transmit electric currents, voltages, signals and/or data with a wide range of currents, voltages, frequencies and/or data rates. In low-, medium- and high-voltage and/or low-, medium- and high-current contexts, and in particular in the automotive sector, such connectors need to ensure the instant transmission of electrical power, signals and/or data in mechanically stressed, warm and possibly hot, unclean, damp and/or chemically aggressive environments. These connectors must also ensure against safety hazards. For example, it is desired that some electrical connectors provide form of touch protection. Touch protection features are provided for minimizing the exposure of the conductive terminals of the connectors, and reducing the of risk electrical shock due to inadvertent contact by, for example, a finger or tool of a person working with or proximate to the connectors. However, these safeguards are often accompanied by several drawbacks, including reduced power handling capability and/or increased overall connector size.

Accordingly, electrical connectors having improved touch protection features are desired.

SUMMARY

An electrical plug-type connection according to an embodiment of the present disclosure comprises a first connector including a connector housing and at least one electrical terminal arranged therein, and a mating connector for coupling to the first connector. The mating connector includes at least one mating electrical terminal extending in an axial direction, and a mating terminal touch protection device movable from an initial position into a final position by the connector housing as the first connector and the mating connector are coupled.

BRIEF DESCRIPTION OF THE DRAWINGS

The invention will now be described by way of example with reference to the accompanying Figures, of which.

DETAILED DESCRIPTION OF THE EMBODIMENTS

Figure 1:
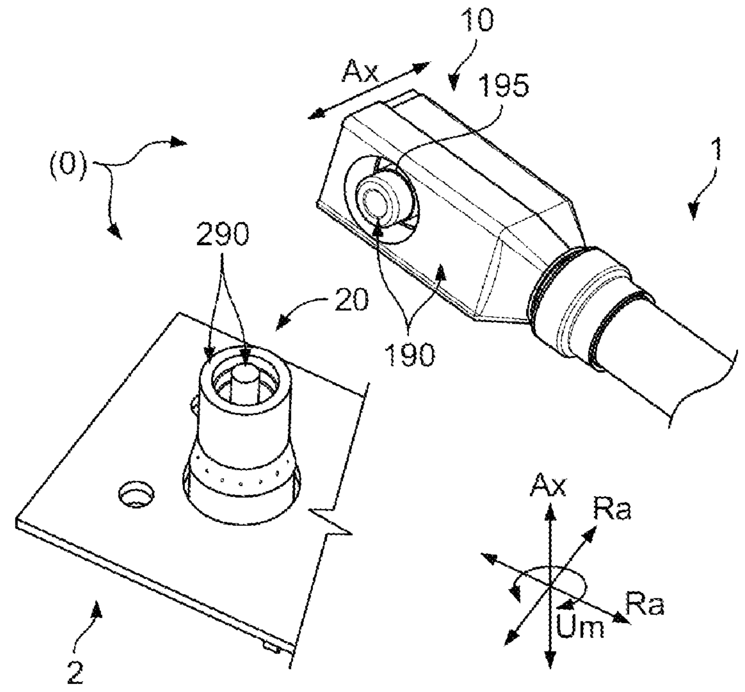
Fig. 1 (Prior Art)
FIG. 1 is a perspective view of a five-part touch protection means for an electrical plug-type connection according to the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6:
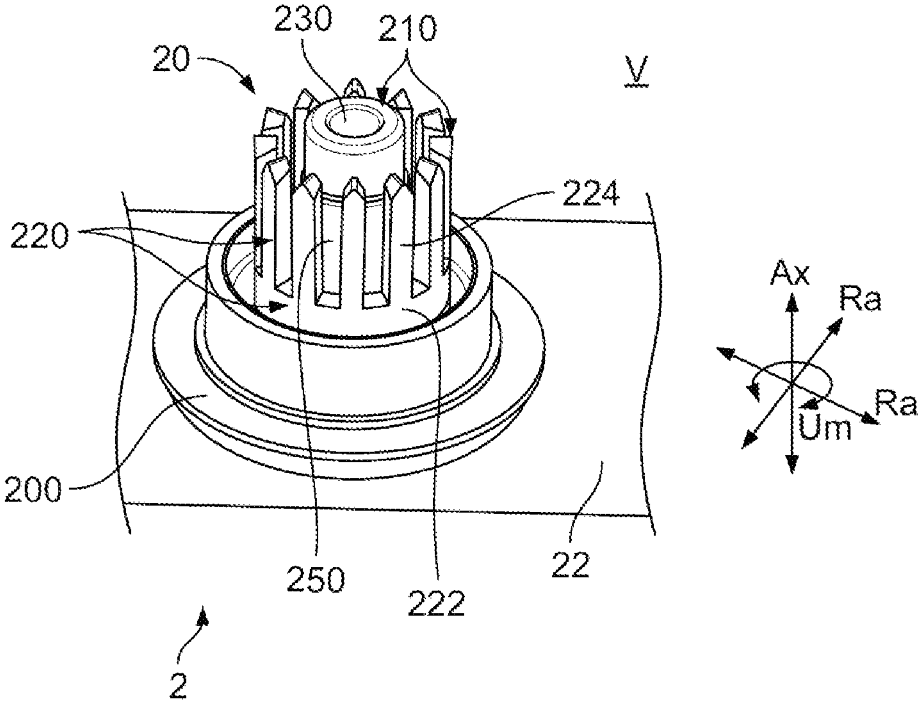
FIG. 6 shows a perspective view of an embodiment of an electrical mating connector according to the invention with a two-part mating terminal touch protection means.
Figure 7:
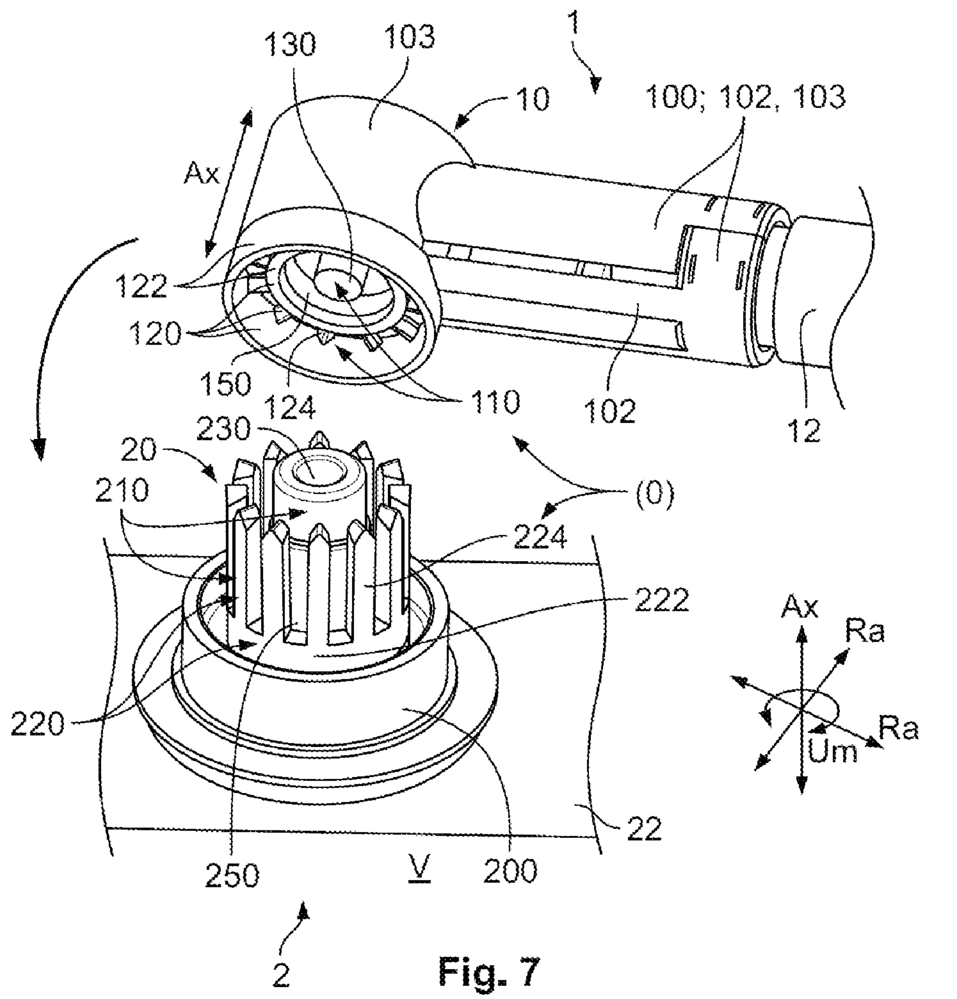
FIG. 7 shows a perspective view of an embodiment of a four-part touch protection means for a plug-type connection according to the invention having a connector according to FIGS. 3 to 5 and a mating connector according to FIG. 6.
Figure 8:
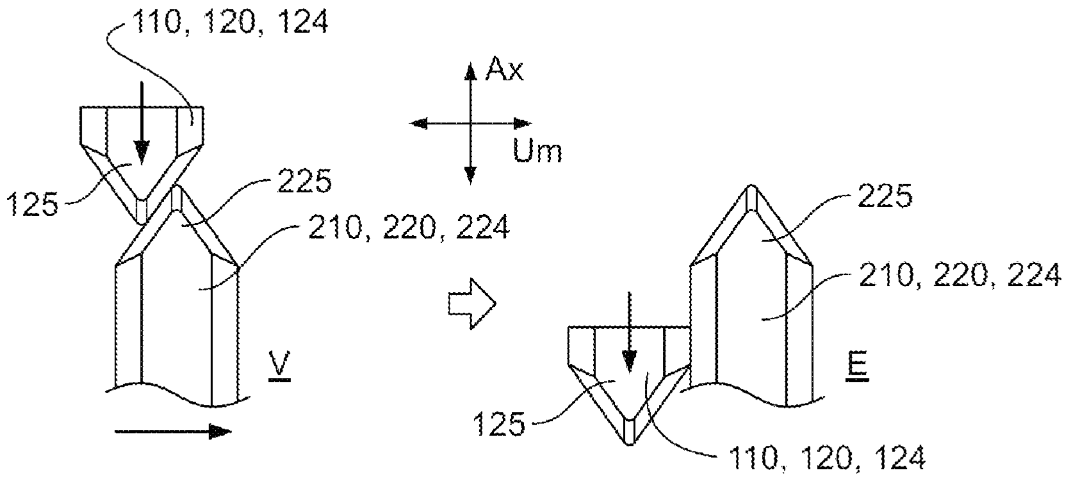
FIG. 8 shows a two-dimensional detailed view of a prong of a mating terminal touch protection device mechanically interacting with a tooth of a connector touch protection device.

The invention is explained in detail below with the aid of exemplary embodiments of the present disclosure including a connector (FIGS. 3 to 5 and 7), a mating connector (FIGS. 6 and 7) and a plug-type connection consisting of the connector and the mating connector (FIG. 7). Although the invention is described and illustrated in more detail by preferred exemplary embodiments, the invention is not limited by the exemplary embodiments disclosed, and instead is of a more fundamental nature. Other embodiments can be derived therefrom and/or from the above (description of the invention) without going beyond the protective scope of the invention. Only those spatial portions of a subject of the invention are shown in the drawings which are required to understand the invention. Terms such as connector and mating connector should be interpreted as synonyms, and may be mutually interchangeable.

Figure 2:
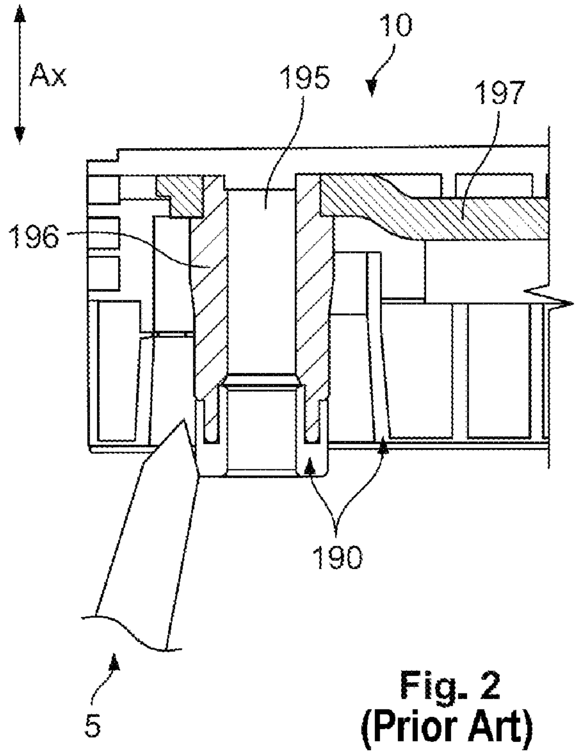
Fig. 2 (Prior Art)
FIG. 2 is a side view in section of the five-part touch protection means for the electrical plug-type connection of FIG. 1.
Figure 3:
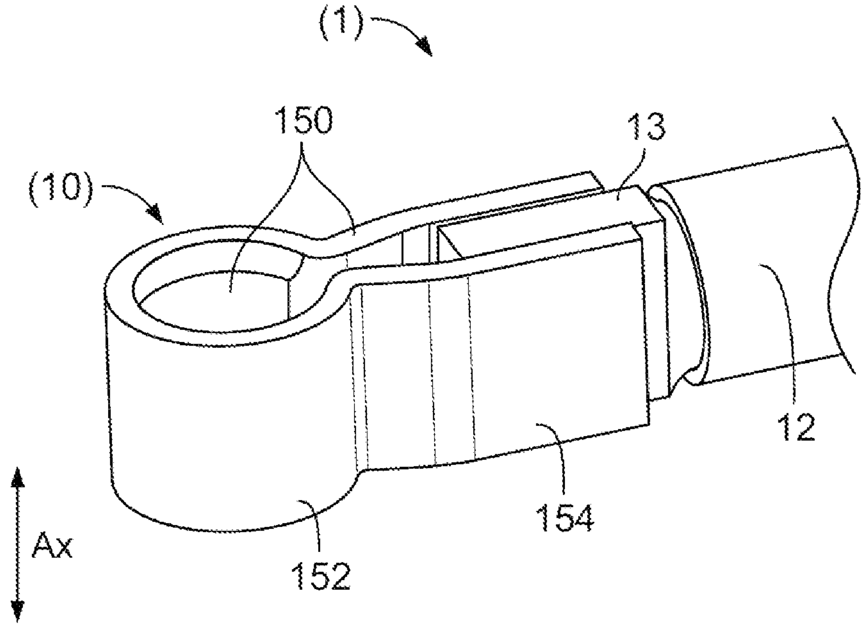
FIG. 3 is a perspective view of an embodiment of an electrical connector according to the invention with a two-part terminal touch protection means.

FIGS. 1 and 2 show a connector 10 with touch protection means and a mating connector 20 with touch protection means for a plug-type connection 0 with touch protection means according to the prior art. In a plug-type connection 0 configured as shown, the connector 10 is adapted such that it can pivot with respect to the mating connector 20. Apart from a housing upper part, a connector touch protection device 190 for a female terminal 195 of the connector 10 comprises a housing lower part and a touch protection ring provided on the free end of the terminal. A mating connector touch protection device 290 for a male mating terminal of the mating connector 20 comprises a sleeve which is closed in the circumferential direction Um of the mating connector 20, and a touch protection cap provided on the free end of the mating terminal.

After the connector 10 and mating connector 20 have been plugged or coupled together, the sleeve of the mating connector 20 is arranged outside the terminal 195 of the connector 10 in the radial direction Ra of the mating connector 20. As a result, an electromechanical connection portion 197 of the terminal 195 can only be arranged on an axial Ax end, opposite a mating face of the terminal 195, of an electromechanical contact portion 196 of the terminal 195. This consequently has only a small cross-section in a transition area from the connection portion 197 to the contact portion 196. Further, the plug-type connection 0 is necessarily relatively tall in the axial direction Ax as a result of the touch protection ring of the terminal 195 and the touch protection cap of the mating terminal.

Embodiments of the present disclosure are explained in detail below with respect to FIGS. 3-8. The female connector 10 according to the invention shown (FIGS. 3 to 5 and 7) comprises a female terminal 150 with an electromechanical contact portion 152 and an electromechanical connection portion 154. The connection portion 154 projects laterally from the contact portion 152 in a radial direction Ra, wherein an axial Ax extent or length of the connection portion 154 and the contact portion 152 are of essentially the same size.

The exemplary female terminal 150 is formed integrally and bent from an essentially rectangular material layer (e.g., punched/die-cut from a piece of sheet metal and possibly bent into shape). A central portion of the original rectangular material layer forms the contact portion 152 having an essentially hollow cylindrical internal opening. Two longitudinal end portions of the rectangular material layer form two opposing lugs between which an electromechanical connection portion 13 of an electric line 12 can be or is fixed. Alternative female terminals 150 such as, for example, a crimp terminal can also be used, however. The female terminal 150 and a longitudinal end portion of the line 12 is accommodated in a connector housing 100 (see FIG. 4). According to an embodiment, the connector 10 comprises substantially only the female terminal 150 and the connector housing 100. The connector 10 and the line 12 connected thereto constitute an electrical entity 1 formed as a pre-assembled electrical cable 1.

The connector housing 100 includes a housing upper part 103 and a housing lower part 102. At least the housing lower part 102 has a (first) connector touch protection device 120, formed as a terminal touch protection means 110 (see FIGS. 4 and 5), for the female terminal 150. The connector touch protection device 120 is formed as a touch protection rim/crown 120. Different designs such as, for example, a touch protection ring, a touch protection cage, etc. can also be used. The touch protection rim/crown 120 comprises at least one support 122 formed as a ring and from which a plurality of relatively (see FIG. 8) short teeth 124 which extend in a radial direction Ra project. In the present embodiment, the support 122 comprises two concentric rings, including an inner ring and an outer ring, between which the teeth 124 are arranged. The teeth 124 have a centring means 125 with an arrow tip design. The teeth 124 are adapted to interact or engage with corresponding prongs 224 of a touch protection comb 220, as will be set forth in detail herein.

Figure 5:
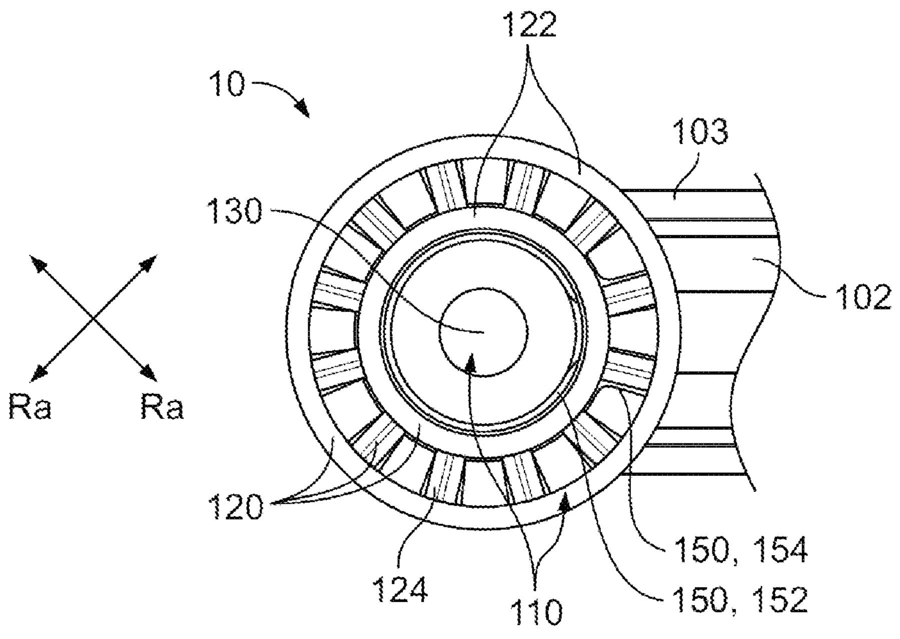
FIG. 5 is a bottom view of the embodiment of the electrical connector having a two-part terminal touch protection means of FIG. 4.

As shown in FIG. 5, the touch protection rim/crown 120 is formed such that the inner ring of the support 122 at least partially covers a free end of the contact portion 152 of the female terminal 150 on the side with the mating face. The rim/crown 120 thus protects a free rim of the female terminal 150 from being touched, for example by a tool 5 or by a worker's finger (see FIG. 2). In one embodiment, two preferably directly adjacent teeth 124 at least partially cover the two transition areas from the contact portion 152 to the connection portion 154 of the female terminal 150, and thus also protect a free rim of the female terminal 150. At least one prong 224 of a first mating connector touch protection device 220 of a mating connector 20 can be placed or can engage between these teeth 124. Otherwise, the connection portion 154 is covered by or behind the housing lower part 102 (see FIG. 5).

Figure 4:
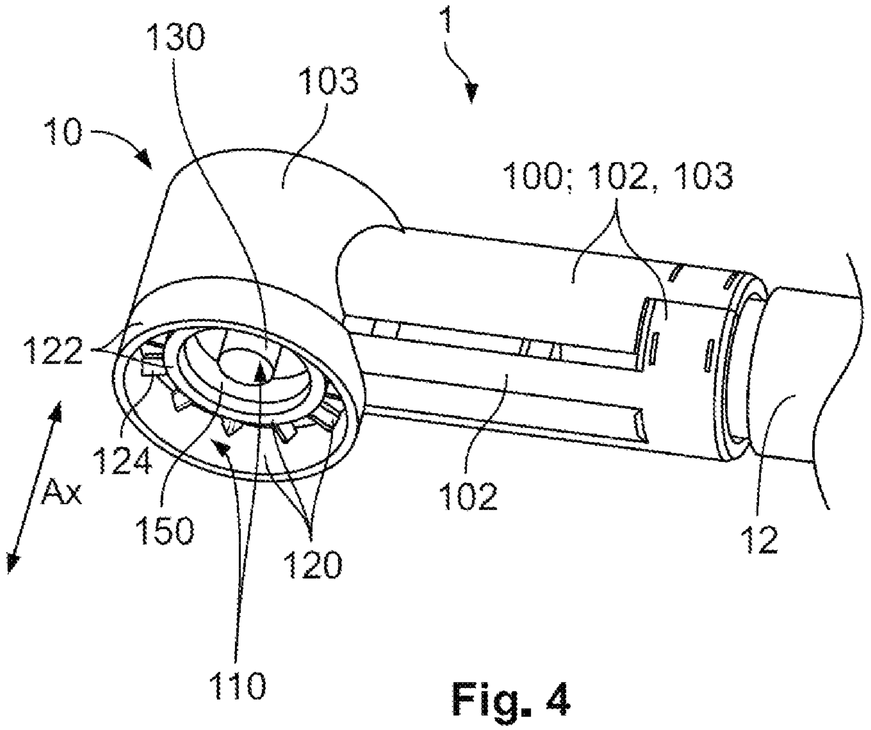
FIG. 4 is another perspective view of the embodiment of the electrical connector having a two-part terminal touch protection means of FIG. 3.

On the outside in an axial direction Ax, the outer ring of the support 122 is preferably flush with, for example, a cylindrical portion of the housing upper part 103, wherein the outer ring and the housing lower part 102 are preferably rigidly connected, and in particular locked to the housing upper part 103. Apart from this connection, the housing upper part 103 can be rigidly connected and/or locked the housing lower part 102, and specifically in a region of the connector housing 100 in which a longitudinal end portion of the line 12 is be held, as shown in FIG. 4.

The terminal touch protection means 110 further includes a second connector touch protection device 130 by which an inner wall of the contact portion 152 of the female terminal 150 is protected from being touched. The second connector touch protection device 130 is formed as a touch protection stud 130 which projects into or through the hollow contact portion 152. Alternative designs, for example, a touch protection cylinder and the like can also be used without departing from the scope of the present disclosure. The second connector touch protection device or the touch protection stud 130 is preferably formed integrally with the housing upper part 103. The housing upper part 103 can thus include the terminal touch protection means 110.

Referring to FIGS. 6 and 7, the mating connector 20 comprises a male mating terminal 250 having an electromechanical contact portion for plugging together with the contact portion 152 of the female terminal 150 and with an electromechanical connection portion for further contacting the male mating terminal 250. In an assembled state, the connection portion is electrically connected to a substrate 22. In the exemplary embodiment, the male mating terminal 250 is formed integrally (e.g., die-cut from a piece of sheet metal). The male mating terminal 250 may also be formed so that it is solid or possibly hollow on the inside, with longitudinal slots, of the like, without departing from the scope of the present disclosure.

A central or longitudinal region of the male mating terminal 250 can be or is held/retained in a mating connector housing 200. In illustrated embodiment, the mating connector housing 200 is formed as a mating terminal base collar 200 which can be or is provided/arranged on the substrate 22. According to an embodiment, the mating connector 20 comprises only the male mating terminal 250 and the mating connector housing 200. The mating connector 20 and, for example, the substrate 22 together form an electrical entity 2.

The mating connector housing 200 preferably has a (first) mating connector touch protection device 220, formed as a mating terminal touch protection means 210, for the male mating terminal 250. The mating connector touch protection device 220 is formed as a touch protection comb 220. Other designs such as, for example, a touch protection sleeve, a touch protection cage, a touch protection ring, and the like can also be used. It is further possible that the substrate 22 includes the mating connector touch protection device 220 formed directly thereon, wherein the mating connector housing 200 may be omitted.

The touch protection comb 220 comprises a single base 222 from which project a plurality of relatively long prongs 224 which extend in the axial direction. The base 222 is formed such that it is at least partially annular or partly circular. The prongs 224 surround the male mating terminal 250 at least partially annularly or partially circularly, but in the exemplary embodiment completely in the circumferential direction Um. At their free longitudinal end portions, the prongs 224 have centring means 225 in the form of an arrow tip. The prongs 224 are adapted to interact or engage with the above-described teeth 124 of the touch protection rim/crown 120.

The touch protection comb 220 is rotatably arranged, for example, on/in the substrate 22 or a device of the substrate 22. In the exemplary embodiment, the touch protection comb 220 is arranged rotatably on/in the mating connector housing 200 or the mating terminal base collar 200, and preferably forms a single part with the latter. The touch protection comb 220 and the mating connector housing 200 or the mating terminal base collar 200 can be ready-made as a single part (for example, in a 2K injection-moulding process) or be plugged into each other by means of, for example, a plug-type connection. This can also be applied to other embodiments of the mating connector touch protection device 220. In an assembled state of the touch protection comb 220, it is situated in an arbitrary initial position V, or one in which it is rotated by any desired amount. In other words, a rotated position of the touch protection comb 220 relative to the mating connector housing 200 or the mating terminal base collar 200, or the axial direction Ax, i.e. a position in the circumferential direction Um, is not specified in detail. A determined initial position V of the touch protection comb 220 can optionally be used. Only once the connector 10 and the mating connector 20 have been plugged together does the touch protection comb 220 assume a determined final position E. A plurality of such final positions E are preferably possible, wherein just one of them is established when the connector 10 and the mating connector 20 are plugged together. This can in turn be applied to other embodiments of the mating connector touch protection device 220.

The mating terminal touch protection means 210 may further include a second mating connector touch protection device 230 by means of which a longitudinal end or a longitudinal end portion of the male terminal 250 can be protected from being touched. In the exemplary embodiment, the second mating connector touch protection device 230 is formed as a touch protection device 230 which sits on top of the male terminal 250, and in particular is locked thereto. The male terminal 250 may be formed such that it is hollow on the inside. This can serve to hold the second connector touch protection device 130 or the touch protection stud 130 of the female terminal 150. Alternative designs such as, for example, a touch protection cap (a male terminal 250 which is not hollow on the inside), etc. can also be used without departing from the scope of the present disclosure.

When the connector 10 and the mating connector 20 are plugged together (see FIGS. 7 and 8) to form the plug-type connection 0, for example the two second touch protection devices 130, 230 (i.e. the touch protection stud 130 and the touch protection ring 230) can first be centred. Before, at the same time, afterwards or alternatively, the teeth 124 of the touch protection rim/crown 120 engage with or in the prongs 224 of the touch protection comb 220 (see the left side of FIG. 8). The teeth 124 of the touch protection rim/crown 120 thereby act to displace the prongs 224 of the touch protection comb 220 which rotate in the circumferential direction Um, and therefore rotate the touch protection comb 220 from its initial position V into its final position E. As the touch protection comb 220 is usually not situated in one of its possible final positions E, such engagement is typically realized as the connector 10 and mating connector 20 are plugged together. In the final position E, the prongs 224 of the touch protection comb 220 are preferably placed radially Ra inside the connector housing 100, in particular the housing upper part 103, of the female mating connector 10. The female terminal 150 and the male terminal 250, or their contact portions, also come into electromechanical contact in the final position E.

In the final position E of the connector 10 at/in the mating connector 20, i.e. of the configured plug-type connection 0, at least or precisely one prong 224 of the touch protection comb 220 can be arranged between two arms of the connection portion 154 and/or on or in a region at a free longitudinal end of the connection portion 13 of the line 12 connected to the terminal 150.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical plug-type connection, comprising:

- a first connector including a connector housing and at least one electrical terminal arranged therein, the connector housing includes a housing terminal touch protection device; and
- a mating connector for coupling to the first connector, the mating connector including:
  - at least one mating electrical terminal extending in an axial direction; and
  - a mating terminal touch protection device movable from an initial position into a final position by the connector housing as the first connector and the mating connector are coupled, the housing terminal touch protection device and the mating terminal touch protection device each include a complementary toothing engaging as the first connector and the mating connector are coupled.

2. The electrical plug-type connection of claim 1, wherein the mating terminal touch protection device is arranged in the mating connector such that it is pivotable, rotatable or revolvable around the mating terminal.

3. The electrical plug-type connection of claim 2, wherein a housing of the mating connector defines a collar at least partially surrounding the mating terminal touch protection device.

4. The electrical plug-type connection of claim 2, wherein the mating terminal touch protection device is rotated between the initial position and the final position by the connector housing.

5. The electrical plug-type connection of claim 4, wherein the mating terminal touch protection device being rotated by the housing terminal touch protection device.

6. The electrical plug-type connection of claim 5, wherein the mating terminal touch protection device is covered by the connector housing after the first and the mating connectors are coupled.

7. The electrical plug-type connection of claim 6, wherein the mating connector has a base on which the mating terminal touch protection device is rotatable.

8. The electrical plug-type connection of claim 7, wherein the base of the mating connector includes a collar at least partially covering the housing terminal touch protection device after the first and the mating connectors are coupled.

9. The electrical plug-type connection of claim 1, wherein the toothing of the mating terminal touch protection device includes a plurality of prongs extending axially from an annular base of the mating terminal touch protection device.

10. The electrical plug-type connection of claim 9, wherein each tooth of the toothing comprises an acute tip for ensuring engagement of the toothing as the connectors are coupled.

11. An electrical connector, comprising:
a base;
a mating terminal extending in an axial direction relative to the base; and
a mating terminal touch protection device including a toothing mounted to the base and rotatable about the mating terminal, the mating terminal touch protection device includes a central ring defining an opening for receiving a corresponding stud of a mating electrical connector.

12. The electrical connector of claim 11, wherein the toothing of the mating terminal touch protection device includes a plurality of prongs extending axially from an annular base of the mating terminal touch protection device.

13. The electrical connector of claim 12, wherein the prongs extend to a height greater than or equal to a height of the mating terminal in the axial direction.

14. The electrical connector of claim 13, wherein the prongs extend to a height less than a height of the central ring in the axial direction.

15. An electrical connector, comprising:
a connector housing;
an electrical terminal in the form of a ring arranged within the housing;
a terminal touch protection device arranged within the housing and including:
a central stud extending through the terminal; and
a toothing arranged between the terminal and the connector housing; and
a connector touch protection device including a first annular ring arranged between the electrical terminal and the toothing, and a second annular ring arranged on a side of the toothing opposite the electrical terminal.

16. The electrical connector of claim 15, wherein the toothing is fixed relative to the connector housing.

17. The electrical connector of claim 15, wherein each tooth of the toothing comprises a centering means in the form of an acute tip.

18. An electrical plug-type connection, comprising:
a first connector including a connector housing and at least one electrical terminal arranged therein, the connector housing includes a housing terminal touch protection device; and
a mating connector for coupling to the first connector, the mating connector including:
at least one mating electrical terminal extending in an axial direction; and
a mating terminal touch protection device movable from an initial position into a final position by the connector housing as the first connector and the mating connector are coupled, the mating terminal touch protection device is arranged in the mating connector such that it is pivotable, rotatable or revolvable around the mating terminal between the initial position and the final position by the housing terminal touch protection device, the mating terminal touch protection device is covered by the connector housing after the first and the mating connectors are coupled, the mating connector has a base on which the mating terminal touch protection device is rotatable, the base of the mating connector includes a collar at least partially covering the housing terminal touch protection device after the first and the mating connectors are coupled.

19. An electrical plug-type connection, comprising:
a first connector including a connector housing and at least one electrical terminal arranged therein; and
a mating connector for coupling to the first connector, the mating connector including:
at least one mating electrical terminal extending in an axial direction; and
a mating terminal touch protection device movable from an initial position into a final position by the connector housing as the first connector and the mating connector are coupled, the mating terminal touch protection device is arranged in the mating connector such that it is pivotable, rotatable or revolvable around the mating terminal, a housing of the mating connector defines a collar at least partially surrounding the mating terminal touch protection device.

* * * * *